United States Patent
Frank et al.

(10) Patent No.: US 8,941,557 B2
(45) Date of Patent: Jan. 27, 2015

(54) ELECTRONIC DISPLAY APPARATUS, INSTALLATION PERTAINING TO AUTOMATION TECHNOLOGY, AND METHOD FOR OPERATING AN ELECTRONIC DISPLAY APPARATUS

(75) Inventors: Edgar Frank, Nürnberg (DE); Benjamin Kohler, Nürnberg (DE); Jörg Middel, Emskirchen (DE); Wolfgang Riedl, Nürnberg (DE); Christian Strömsdörfer, Nürnberg (DE); Frank Volkmann, Nürnberg (DE); Michael Wieczorek, Erlangen (DE); Sebastian Wittig, Obersasbach (DE)

(73) Assignee: Siemens Aktiengesellschaft, Munich (DE)

( * ) Notice: Subject to any disclaimer, the term of this patent is extended or adjusted under 35 U.S.C. 154(b) by 784 days.

(21) Appl. No.: 13/061,411

(22) PCT Filed: Aug. 28, 2008

(86) PCT No.: PCT/EP2008/007209
§ 371 (c)(1),
(2), (4) Date: Feb. 28, 2011

(87) PCT Pub. No.: WO2010/022759
PCT Pub. Date: Mar. 4, 2010

(65) Prior Publication Data
US 2011/0164074 A1 Jul. 7, 2011

(51) Int. Cl.
*G09G 5/00* (2006.01)
*G09G 5/36* (2006.01)
(Continued)

(52) U.S. Cl.
CPC ............. *G02F 1/163* (2013.01); *G06F 1/3203* (2013.01); *G06F 1/3218* (2013.01); *G05B 2219/25289* (2013.01)
USPC ............. 345/3.1; 345/690; 345/204; 345/1.1; 345/87; 345/100; 345/4; 345/108; 345/111; 359/275; 725/108

(58) Field of Classification Search
USPC .......................................... 345/1.1, 204, 690
See application file for complete search history.

(56) References Cited

U.S. PATENT DOCUMENTS 5,808,711 A * 9/1998 Suppelsa et al. ................. 349/74
5,838,286 A * 11/1998 Pfeiffer et al. ................... 345/30

(Continued)

FOREIGN PATENT DOCUMENTS

WO WO 2007/003533 A1 1/2007
WO WO 2007/031043 A1 3/2007

(Continued)

*Primary Examiner* — Grant Sitta
(74) *Attorney, Agent, or Firm* — Cozen O'Connor

(57) ABSTRACT

An electronic display apparatus comprising a control device and an electronic display panel that can be turned off by the control device. In order to support an energy-saving state in which information can continue to be displayed at least to a certain extent, an electrochromic display is additionally provided that is switchable into different display states by the control device. The invention furthermore relates to an installation appertaining to automation technology, and to a method for operating an electronic display apparatus.

16 Claims, 1 Drawing Sheet

(51) Int. Cl.
*G02F 1/163* (2006.01)
*G06F 1/32* (2006.01)

(56) References Cited

U.S. PATENT DOCUMENTS

| | | | |
|---|---|---|---|
| 6,043,798 A * | 3/2000 | Yamamoto et al. | 345/1.1 |
| 6,349,221 B1 * | 2/2002 | Wolf et al. | 455/566 |
| 6,445,489 B1 * | 9/2002 | Jacobson et al. | 359/296 |
| 7,205,959 B2 * | 4/2007 | Henriksson | 345/4 |
| 2002/0097194 A1 * | 7/2002 | Uchida et al. | 345/3.1 |
| 2004/0205825 A1 * | 10/2004 | Kawabe et al. | 725/108 |
| 2004/0252076 A1 * | 12/2004 | Kodama | 345/3.1 |
| 2008/0007486 A1 * | 1/2008 | Fujinawa et al. | 345/5 |
| 2008/0170287 A1 * | 7/2008 | Champion et al. | 359/275 |
| 2011/0018897 A1 * | 1/2011 | Uchiyama et al. | 345/619 |
| 2011/0260948 A1 * | 10/2011 | Teng et al. | 345/1.1 |

FOREIGN PATENT DOCUMENTS

| | | |
|---|---|---|
| WO | WO 2007/071531 A1 | 6/2007 |
| WO | WO 2007/071534 A1 | 6/2007 |

* cited by examiner

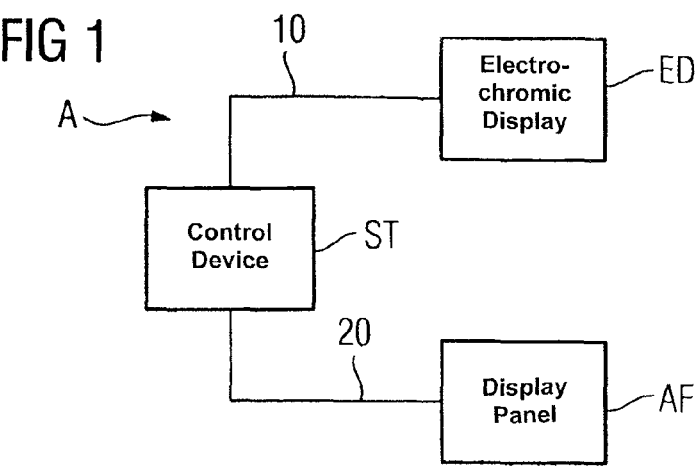
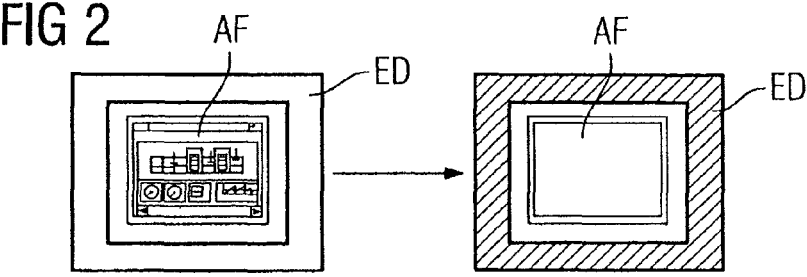
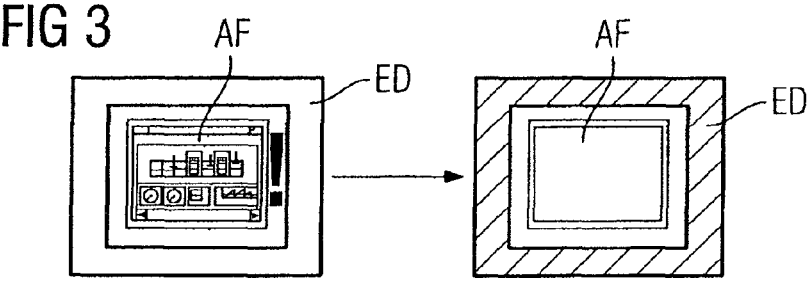
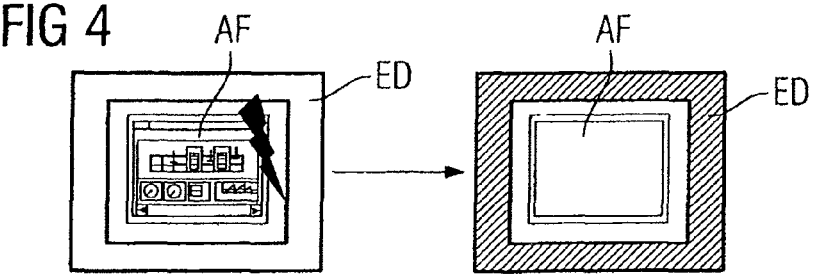

ELECTRONIC DISPLAY APPARATUS, INSTALLATION PERTAINING TO AUTOMATION TECHNOLOGY, AND METHOD FOR OPERATING AN ELECTRONIC DISPLAY APPARATUS

CROSS-REFERENCE TO RELATED APPLICATIONS

This is a U.S. national stage of International Application No. PCT/EP2008/007209, filed on 28 Aug. 2008.

BACKGROUND OF THE INVENTION

1. Field of the Invention

The invention relates to electronic displays and, more particularly, to an electronic display apparatus with a control device and an electronic display panel that can be turned off by the control device.

2. Description of the Related Art

A wide variety of electronic display apparatuses are known. A laptop is one widely used example. The control device can generally comprise, for example, a microprocessor, and the electronic display panel, for example, can comprise a Liquid Crystal Display (LCD) or a Thin Film Transistor Liquid Crystal Display (TFT-LCD). Here, deactivation of the electronic display panel customarily serves to reduce the electricity/energy consumption of the electronic display apparatus. In the case of laptops, for example, it is familiar for the electronic display panel, comprised of the screen, to be switched to a standby mode.

Within the framework of the operation of industrial production plants, thus for example in connection with installations pertaining to automation technology, reduction of the energy consumption of the installation is gaining in significance from both economic and environmental perspectives. Corresponding installations generally have a multiplicity of electronic display apparatuses, which particularly serve to display status messages about the installation, and are also designated panels for operation and observation. In contrast to an electronic display apparatus comprising a conventional laptop such electronic display apparatuses employed for control and monitoring purposes are generally subject to the requirement that incoming status messages be permanently visible on the respective electronic display device during operation of the installation, in order to enable ongoing monitoring of the installation and where applicable the initiation of urgently required measures. This results in corresponding electronic display apparatuses generally being switched on at all times, as the deactivation of the electronic display panel, which may basically be technically possible on a frequent basis, is not permitted on safety grounds or is allowed only in individual cases.

SUMMARY OF THE INVENTION

It is therefore an object of the present invention to provide a control device and an electronic display apparatus having an electronic display panel that can be deactivated by the control device, which supports an energy-saving state, in which, at least to a certain extent, further information can be displayed.

This and other objects and advantages are achieved in accordance with the invention by an electronic display apparatus with a control device and an electronic display panel that can be turned off by the control device, where an electrochromic display is additionally provided and the electrochromic display can be switched to different display states by the control device.

The inventive electronic display apparatus is advantageous, as due to its additional electrochromic display it enables information, for example, relating to the state of a monitored installation, to be displayed even with the electronic display panel deactivated. Electrochromic displays are, for example, known from the published international patent applications WO 2007/071531 A1, WO 2007/071534 A1 and WO 2007/003533 A1. Here, electrochromic displays demonstrate the basic advantage that they only consume energy upon switching or upon actuation. The corresponding display state is then maintained by the electrochromic display without further energy being required for this purpose. Consequently, in contrast to other electronic display panels, permanent display is possible without the consumption of energy. The electrochromic display can thus advantageously be used to present information at least to a certain extent when the electronic display panel state is in the deactivated state.

In a particularly preferred embodiment, the electronic display apparatus is configured such that the different display states differ in respect of the color of the electrochromic displays, of the text represented on the electrochromic display and/or a graphic shown on the electrochromic display. Thus the possibility advantageously exists, for example, that important information available to the electronic display apparatus is represented or signaled solely on the basis of the color of the electrochromic display. Here, it is conceivable, for example, that in the event of an alarm status obtaining, the electrochromic display is switched to a display state in which the electrochromic display is completely red in color. Simple, and at the same time clear signaling of the corresponding state is thereby enabled. In addition, with the signaling of different display states by the color of the electrochromic displays, a comparatively simply designed electrochromic display can advantageously be used, because this does not essentially give rise to any requirements in terms of the resolution provided by the electrochromic display. In this preferred embodiment, for example, an electrochromic polymer can thus be employed whose color can be changed by a corresponding activation. Consequently, within the framework of the presently contemplated embodiment of the invention, the term 'electrochromic display' also encompasses such comparatively simple and as a rule thus also relatively cost-effective embodiments of a display, using the phenomenon of electrochromicity. Alternatively or in addition to the use of display states differing from each other in respect of the color of the electrochromic displays, display states can furthermore also be employed which differ in respect of a text shown on the electrochromic display and/or a graphic represented on the electrochromic display, possibly in the form of an icon.

In principle, the electrochromic display can be arranged within the electronic display apparatus in any way relative to the electronic display panel. As a result, the electrochromic display and the electronic display panel can, for example, be arranged adjacent to or above one another. In a particularly preferred embodiment of the electronic display apparatus, the electrochromic display is arranged in the form of a frame around the electronic display panel. This offers the advantage that a user's attention can be very effectively attracted by the electrochromic display, where a comparatively space-saving arrangement is at the same time achieved. It is thus, for example, conceivable that in the event that the electronic display panel is deactivated by the control device and at the same time an alarm status is recognized on the part of the electronic display apparatus, the electrochromic display which is arranged in the form of a frame around the electronic display panel is switched to a display state in which it has, for example, a red or other conspicuous color. Such a red frame around the electronic display panel which is generally employed for the presentation of information ensures that, for example, the operating personnel of a technical installation are informed of the present alarm status even with the electronic display panel deactivated. Here, more precise information about the particular alarm status can, for example, be accessed in that an operating action is performed on the electronic display apparatus and the electronic display panel is hereby switched on once more.

In a further particularly preferred embodiment, the electronic display apparatus is configured such that the electrochromic display can be switched to different display states by the control device depending on whether at least one status message has been received by the electronic display apparatus. This offers the advantage that the presence of a status message, which because of the deactivated electronic display panel is not visible on the latter, can be displayed by the electrochromic display.

The electronic display apparatus in accordance with the contemplated embodiments can further also advantageously be configured such that the electrochromic display can be switched to different display states by the control device depending on a category classifying the type of at least one received status message. This offers the advantage that status messages of a different category which are or have been received by the electronic display apparatus, can be displayed in respect of their category by different display states of the electrochromic display. It is, for example, hereby possible to classify status messages that indicate the orderly operation of a plant, and alarm or fault messages that indicate the occurrence of unforeseen events, in different categories. It is thus, for example, feasible that an incoming or existing status message which is purely informational in character is indicated by a yellow color of the electrochromic display, while a status message which signals an alarm or a fault is indicated by the electrochromic display taking on a red color. A corresponding classification of received status messages can, for example, occur based on a corresponding identification of the status messages. It is thus, for example, possible for alarm messages to be indicated by the setting of a particular bit or a defined text string.

In a particularly preferred embodiment of the electronic display apparatus, the control device is configured for the categorization of the at least one received status message. Consequently, the control device is in a position to recognize the category of received status messages. This can, for example, take place based on an analysis of the received status message and/or based on a comparison of at least part of the status message with reference data stored in a memory device.

The electronic display apparatus can also advantageously be configured such that the electrochromic display can be switched to a different display state by the control device, insofar as, with the electronic display panel deactivated, at least one status message with a category changed compared with an earlier status message is received by the electronic display apparatus. It is hereby advantageously made possible that even with the electronic display panel deactivated, for the display states of the electrochromic displays to be changed. This can, for example, apply to the case where the electronic display panel is switched to a state in which there was no status message for the electronic display apparatus. Insofar as a corresponding status message, possibly in the form of an alarm message, is received by the electronic display apparatus, the possibility advantageously exists to change the display state of the electrochromic displays, for example by changing the color of the electrochromic displays. Advantageously, reactivation of the electronic display panel is thus only then required if a more precise investigation of a fault which has occurred and if applicable an operating or input action is to occur at the electronic display apparatus.

In a further particularly preferred embodiment of the inventive electronic display apparatus, the electronic display apparatus has at least one input device and the control device for the deactivation of the electronic display panel is further provided, insofar as no operating action is registered by the at least one input device over a defined period of time. This is advantageous, as the electronic display apparatus is thus only switched to an energy-saving mode in situations in which no operating action has been registered on an input device of the electronic display apparatus for a defined period of time, such as 10 minutes. The corresponding input device can here, for example, take the form of a keyboard or a computer mouse.

The electronic display device can in principle comprise a device employed in any field and for any purpose. In a particularly preferred embodiment of the inventive electronic display apparatus, the electronic display device is a panel for operating and observing an installation pertaining to automation technology. This is advantageous because particularly in the case of such panels, complete deactivation of an electronic display panel has to date not generally been possible, because for reasons of safety at least data or information characterizing the state of a monitored process or a monitored component is to be displayed. In accordance with the contemplated embodiments of the invention this is however directly enabled by the electrochromic display, so that an energy-saving standby state can also be realized for panels for the operation and observation of an installation pertaining to automation technology.

In another embodiment, the electronic display panel can comprise a display panel employing any technology which is known per se. This includes, for example, displays panels comprising conventional screens with cathode ray tubes. In a particularly preferred embodiment of the inventive electronic display apparatus, the electronic display panel comprises a liquid crystal screen, a thin film transistor liquid crystal screen, a plasma screen or a screen using organic LEDs. Frequently used forms of electronic display panels, which are thus also available at comparatively low cost, are advantageously involved here.

The invention additionally comprises an installation pertaining to automation technology with at least one inventive electronic display apparatus or at least one of the previously described preferred embodiments of the electronic display apparatus in accordance with the contemplated embodiments. Such an installation is advantageous, as compared with conventional installations, because it enables a reduction in electricity/energy consumption for the installation.

The invention further relates to a method for operating an electronic display apparatus.

As regards the method, the present invention is based on the object of specifying a method for operating a electronic display apparatus, which even in an energy-saving state enables the electronic display apparatus to continue to display information, at least to a certain extent.

According to the invention this object is achieved by a method for operating an electronic display apparatus with a control device, an electronic display panel and an electrochromic display comprising switching of the electrochromic display to one of a number of available display states by the control device, and deactivating the electronic display panel by the control device.

The advantages of the inventive method essentially correspond to those of the inventive electronic display apparatus, so that in this connection, reference is made to the relevant present embodiments. The same applies in respect of the preferred developments of the inventive method listed below, in relation to the previously described corresponding preferred developments of the inventive electronic display apparatus.

The inventive method is advantageously embodied such that by switching the electrochromic display to a display state, the color of the electrochromic display is set, different texts are shown, and/or different graphical representations are shown on the electrochromic display.

In an advantageous embodiment of the method, an electrochromic display comprising a frame arranged around the electronic display panel is switched.

The method in accordance with the invention can also preferably proceed such that the electrochromic display is switched to different display states by the control device depending on whether at least one status message has been received by the electronic display apparatus.

In a particularly preferred embodiment of the method in accordance with the invention, the electrochromic display is switched to different display states by the control device, depending on a category classifying the type of at least one received status message.

In a further particularly preferred embodiment, at least one status message is categorized by the electronic display apparatus.

In a particularly preferred embodiment, the electrochromic display is switched to another display state, insofar as with a deactivated electronic display panel, at least one status message with a category changed compared with an earlier status message is received by the electronic display apparatus.

In a further preferred embodiment, the electronic display panel is deactivated, insofar as no operating action is registered by the electronic display device over a defined period of time.

In a further preferred embodiment, a panel for operating and observing an installation pertaining to automation technology is used as an electronic display apparatus.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of exemplary embodiments, in which:

FIG. 1 shows a schematic block diagram of an exemplary electronic display apparatus in accordance with an embodiment of the invention, FIG. 2 shows a schematic representation to illustrate a first exemplary embodiment of the inventive method, in which the electrochromic display is switched to a first display state, FIG. 3 shows a schematic representation to illustrate a second exemplary embodiment of the inventive method, in which the electrochromic display is switched to a second display state; and FIG. 4 shows a schematic representation to illustrate a third exemplary embodiment of the inventive method, in which the electrochromic display is switched to a third display state.

DETAILED DESCRIPTION OF THE PREFERRED EMBODIMENTS

On grounds of improved clarity identical reference characters are used in the figures for identical components or those with the same function.

FIG. 1 shows a schematic representation of an exemplary embodiment of the inventive electronic display apparatus. That is, FIG. 1 represents an electronic display apparatus A which, within the framework of the exemplary embodiment described in the following, comprises a panel for operating and observing an installation related to automation technology. The electronic display apparatus A has an electronic display panel AF and a control device ST. Here, the control device ST is configured for the deactivation of the electronic display panel AF, so that it is made possible, for example, in the event that no operating action is registered over a defined period of time by an input device of the electronic display apparatus A, which is not shown in FIG. 1, for deactivation of the electronic display panel AF to be performed by the control device ST. The electricity/energy consumption of the electronic display apparatus A is hereby in particular reduced, and in addition the useful life of the electronic display panel AF is increased.

The electronic display panel AF comprises a conventional display panel, such as a liquid crystal screen (LCD), a thin film transistor liquid crystal screen (TFT-LCD) or a plasma screen.

However, in order to enable information to be displayed at least to a certain extent, even with the electronic display panel AF of the electronic display apparatus A in a deactivated state, the electronic display apparatus A additionally includes an electrochromic display ED. If the electronic display apparatus A is now to be switched to an energy-saving state, then in a first method step 10 the electrochromic display ED is initially switched to one of a multiplicity of available display states by the control device ST. The electronic display panel AF is then deactivated by the control device ST in method step 20.

The respective display state of the electrochromic display ED now further advantageously signals an item of information that can, for example, involve the type of at least one status message which may have been received by the electronic display apparatus A before or after deactivation of the electronic display panel AF. Consequently, even with the electronic display panel AF deactivated, an item of status information can further be displayed by the electrochromic display ED of the electronic display device A. To this end, the control device ST is advantageously configured for the categorization of at least one received status message. Consequently, for example, normal, non-critical status messages can be differentiated from critical alarm messages. The use of the electrochromic display ED to indicate whether and if applicable in which category a status message is present is advantageous, because after its activation, i.e., after it has been switched to one of the available display states, the electrochromic display ED requires no further electricity and thus no energy.

FIG. 2 shows a schematic representation to illustrate a first exemplary embodiment of the method in accordance with the invention, in which the electrochromic display is switched to a first display state. A front view of an electronic display panel AF of an electronic display apparatus A is represented. Also shown is an electrochromic display ED, which comprises a frame around the electronic display panel AF. In the representation in the left-hand section of FIG. 2, the electronic display panel AF is in an active state, i.e., the electronic display panel AF is switched on. As a result, for example, process values pertaining to an automation system can be displayed in text-based and/or graphical form.

Insofar as the electronic display panel AF is now to be switched to a standby-state, possibly because of the absence of operating actions, which could, for example, be undertaken by an input device comprising a keyboard or a mouse, or also due to the absence of status messages from components of the automation system, which may comprise actuators or sensors for example, this takes place in such a way that the electrochromic display ED is initially switched to one of a number of available display states. This is represented on the right-hand side of FIG. 2 by a corresponding hatching of the electrochromic display ED comprising the frame, where it should be assumed that based on the type/category of the at least one status message, the electronic display apparatus A detects that the system monitored by the electronic display apparatus is in a normal state. Accordingly, the electrochromic display ED in the described exemplary embodiment is switched to a display state, in which the electrochromic display ED has a green color. It is hereby signaled, in a particularly simple manner, that a more comprehensive observation or analysis of the status messages available due to the electronic display apparatus A is not required. This is a prerequisite for enabling the electronic display panel AF then to be deactivated by a control device ST of the electronic display apparatus A which is not shown in FIG. 2. An energy-saving state relative to the situation depicted on the left-hand side of FIG. 2 is hereby assumed, where a possibly safety-critical loss of information on the part of the operating personnel of the installation pertaining to automation technology is at the same time advantageously avoided.

FIG. 3 shows a schematic representation to illustrate a second exemplary embodiment of the method in accordance with the invention, in which the electrochromic display is switched to a second display state. Here, the representation corresponds to that of FIG. 2, with the single difference that, as indicated by the exclamation mark in the left-hand section of FIG. 2, a status message containing information about the current state of the installation is present. As in this case, a security-critical status message is not involved, within the framework of the described exemplary embodiment the electrochromic display ED is switched to a display state in which it is yellow in color, upon or before deactivation of the electronic display panel AF. Likewise, in the event that the electrochromic display ED is already in the state depicted in the right-hand section of FIG. 2, i.e., green in color, then upon a status message arriving at the electronic display apparatus A, a switching of the display status of the electrochromic display ED occurs such that the color of the frame-like electrochromic display ED is changed from green to yellow.

FIG. 4 shows a schematic representation to illustrate a third exemplary embodiment of the method in accordance with the invention, in which the electrochromic display is switched to a third display state. In contrast to FIG. 3, a status message arriving or already present in FIG. 4 comprises an alarm or error message. This is indicated in the left-hand section of FIG. 4 by a corresponding symbol shown as a lightning bolt.

Insofar as the electronic display panel AF is now to be deactivated, or is already deactivated, the electrochromic display ED is switched to a display state, in which it is red in color. A particularly simple and attention-grabbing signaling of the present alarm status or the present alarm status message hereby occurs.

Here, should be pointed out that the different display states could alternatively or additionally also be realized by different text displayed on the electrochromic display ED and/or different graphical representations on the electrochromic display ED.

According to the previously described exemplary embodiments the electrochromic display ED of the electronic display apparatus A thus advantageously enables status messages relating to a monitored installation or a monitored process to be reflected even in a situation in which the electronic display apparatus A in the form of the panel is switched to an energy-saving state by the deactivation of the electronic display panel AF. It is hereby ensured that important status messages/status information do not go missing, but can also be signaled with the electronic display panel AF deactivated, at least in respect of its category. The electrochromic display ED requires electricity only on one occasion upon its actuation. As a result, the energy consumption is hereby advantageously reduced to a minimum.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. An electronic display apparatus, comprising:
   a control device;
   an electronic display panel deactivatable by the control device; and
   an electrochromic display switchable to different display states by the control device, the electrochromic display being arranged as a frame around the electronic display panel;
   wherein the different display states differ in at least one of a color of the electrochromic display, a text represented on the electrochromic display and a graphic represented on the electrochromic display in an event that an alarm status is present; and
   wherein the electrochromic display is switchable to different display states by the control device depending on a category classifying a type of at least one received status message pertaining to automation technology.

2. The electronic display apparatus as claimed in claim 1, wherein the electrochromic display is switchable to different display states by the control device depending on whether at least one status message has been received by the electronic display apparatus.

3. The electronic display apparatus as claimed in claim 1, wherein the control device is configured to categorize of the at least one received status message.

4. The electronic display apparatus as claimed in claim 1, wherein the electrochromic display is switchable to a different display state by the control device when the electronic display panel is deactivated, and at least one status message with a changed category compared to an earlier status message is received by the electronic display apparatus.

5. The electronic display apparatus as claimed in claim 3, wherein the electrochromic display is switchable to a different display state by the control device when the electronic display panel is deactivated, and at least one status message with a changed category compared to an earlier status message is received by the electronic display apparatus.

6. The electronic display apparatus as claimed in claim 1, wherein the electronic display apparatus has at least one input device and the control device is provided for deactivation of the electronic display panel when no operating action is registered by the at least one input device over a defined period of time.

7. The electronic display apparatus as claimed in claim 1, wherein the electronic display apparatus is a panel for operating and observing an installation pertaining to automation technology.

8. The electronic display apparatus as claimed in claim 1, wherein the electronic display panel is one of a liquid crystal screen, a thin film transistor liquid crystal display screen, a plasma screen and a screen employing organic LEDs.

9. An installation of automation technology with at least one electronic display apparatus as claimed in claim 1.

10. A method for operating an electronic display device with a control device, an electronic display panel and an electrochromic display, the method comprising:
   switching the electrochromic display arranged as a frame around the electronic display panel to one of a multiplicity of available display states by the control device by switching the electrochromic display to different display states by the control device depending on a category classifying a type of at least one received status message pertaining to automation technology; and
   deactivating the electronic display panel by the control device;
   wherein the switching the electrochromic display includes at least one of setting a color of the electrochromic display, showing different texts on the electrochromic display and showing different graphical representations are shown on the electrochromic display, if an alarm status is present.

11. The method as claimed in claim 10, wherein the step of switching comprises switching the electrochromic display to different display states by the control device, depending on whether at least one status message has been received by the electronic display apparatus.

12. The method as claimed in claim 10, wherein the step of switching comprises switching the electrochromic display to different display states by the control device, depending on whether at least one status message has been received by the electronic display apparatus.

13. The method as claimed in claim 10, wherein the at least one status message is categorized by the electronic display apparatus.

14. The method as claimed in claim 11, wherein the step of switching comprises switching the electrochromic display to another display state when the electronic display panel deactivated and at least one status message with a category changed in comparison with an earlier status message is received by the electronic display device.

15. The method as claimed in claim 10, wherein step of deactivating the comprises deactivating the electronic display panel when no operating action is registered by the electronic display apparatus over a defined period of time.

16. The method as claimed in claim 10, wherein electronic display apparatus comprising a panel for operating and observing an installation pertaining to automation technology.

* * * * *